(12) United States Patent
Gokan et al.

(10) Patent No.: US 7,377,350 B2
(45) Date of Patent: May 27, 2008

(54) DISPOSITION STRUCTURE OF HEAT EXCHANGER IN MOTORCYCLE

(75) Inventors: Yoshitsugu Gokan, Saitama (JP); Yasushi Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 526 days.

(21) Appl. No.: 11/017,850

(22) Filed: Dec. 22, 2004

(65) Prior Publication Data
US 2005/0139403 A1 Jun. 30, 2005

(30) Foreign Application Priority Data

Dec. 26, 2003 (JP) ............................. 2003-435632
Jun. 18, 2004 (JP) ............................. 2004-181274

(51) Int. Cl.
*B60K 11/04* (2006.01)

(52) U.S. Cl. ................ 180/229; 180/68.4; 123/196 AB (58) Field of Classification Search ................. 180/229, 180/68.4
See application file for complete search history.

(56) References Cited

U.S. PATENT DOCUMENTS

| | | | | |
|---|---|---|---|---|
| 4,516,630 A | * | 5/1985 | Yamaguchi | .................. 165/47 |
| 4,537,273 A | * | 8/1985 | Funabashi | .................... 180/229 |
| 4,589,512 A | * | 5/1986 | Yamaguchi | .................. 180/229 |
| 4,640,341 A | * | 2/1987 | Ozawa | ......................... 165/41 |
| 4,660,624 A | * | 4/1987 | Yamaguchi | ................... 165/41 |
| 5,244,036 A | * | 9/1993 | Michl | .......................... 165/300 |
| 5,887,561 A | * | 3/1999 | Spurgin | ................ 123/196 AB |
| 5,901,808 A | * | 5/1999 | Swenson et al. | ............. 180/229 |

FOREIGN PATENT DOCUMENTS

JP 1-176591 U 12/1989
JP 3206151 B2 7/2001

* cited by examiner

*Primary Examiner*—Tony Winner
(74) *Attorney, Agent, or Firm*—Birch, Stewart, Kolasch & Birch, LLP (57) ABSTRACT

A disposition structure of a heat exchanger (oil cooler) in a motorcycle mounted in the central part in front of the upper part of the crankcase of an internal combustion engine E mounted on the motorcycle. When viewed from the front of the motorcycle, the oil cooler is located between the front forks. The oil cooler is disposed so that the fin surface of the cooling fins of the heat exchanger are perpendicular or substantially perpendicular to an air flow that goes between the front forks and above the front wheel. In the disposition structure so configured, cooling efficiency of the heat exchanger is improved.

19 Claims, 12 Drawing Sheets

BACKGROUND ART

DISPOSITION STRUCTURE OF HEAT EXCHANGER IN MOTORCYCLE

CROSS-REFERENCE TO RELATED APPLICATION

The present application claims priority under 35 U.S.C. §119 to Japanese Patent Application No. 2003-435632, filed Dec. 26, 2003, Japanese Patent Application No. 2004-181274, filed Jun. 18, 2004, the entire contents of which are hereby incorporated by reference.

BACKGROUND OF THE INVENTION

1. Field of the Invention

The present invention relates to a disposition structure of a heat exchanger in a motorcycle, and more particularly to improvement technique on a disposition structure of a heat exchanger on a motorcycle, which has been considered from a point of view of improving cooling efficiency of the heat exchanger.

2. Description of Background Art

Conventionally, as disposition structure of the heat exchanger in a motorcycle, there is known structure in which a heat exchanger has been disposed forward of an internal combustion engine. Thus, this disposition structure of the heat exchanger is that it has been arranged in a substantially upright position to a vehicle advance direction.

Since, however, since an actual air flow passes through and between front forks and above the front wheel, and then goes toward the internal combustion engine (see, for example, Japanese Patent No. 3206151 (P.3, FIG. 1-2), and Japanese Utility Model Laid-Open No. Hei 1-176591), in such a disposition structure of the heat exchanger, an angle of incidence of the air flow to cooling fins of the heat exchanger becomes small so that no high cooling effect can be obtained. As a result, the maximum efficiency in the heat exchanger could not be brought about; however in order to secure sufficient cooling property in the internal combustion engine, it was necessary to make the heat exchanger larger sized. In the case of an air-cooled internal combustion engine, when there is the heat exchanger in front of the internal combustion engine, an air flow rate to be applied to the engine decreases, and when the heat exchanger is large, a problem in design cannot be ignored either.

Figure 13A:
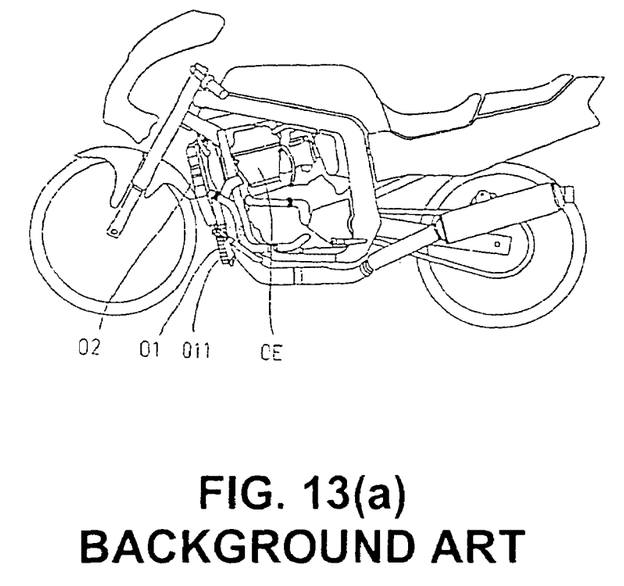
FIG. 13(a) is a side view.
Figure 13B:
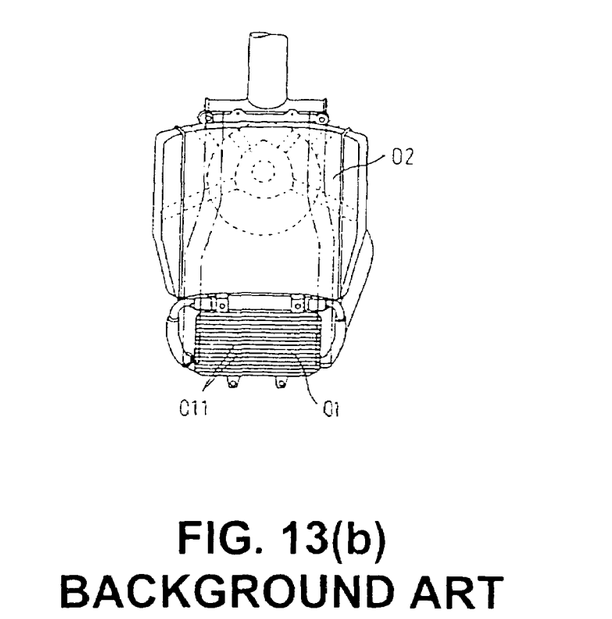
FIG. 13(b) is a front view.

In the invention described in Japanese Patent No. 3206151, shown in FIGS. 13(a) and 13(b), there has been described disposition structure of an oil cooler 01 in which a water-cooled engine 0E mounted on a motorcycle is described. An oil cooler 01 of this engine 0E is installed in the lower part, forward of the engine 0E below a radiator 02; and the oil cooler 01 is disposed with respect to the vehicle body with the slightly upper portion of a surface on which its multiplicity of cooling fins 011 stand in a row forward tilted. These cooling fins 011 extend in a direction orthogonal to the vehicle advance direction, and therefore, these cooling fins 011 are arranged with their fin surface at an angle substantially parallel with respect to the air flow.

Figure 14:
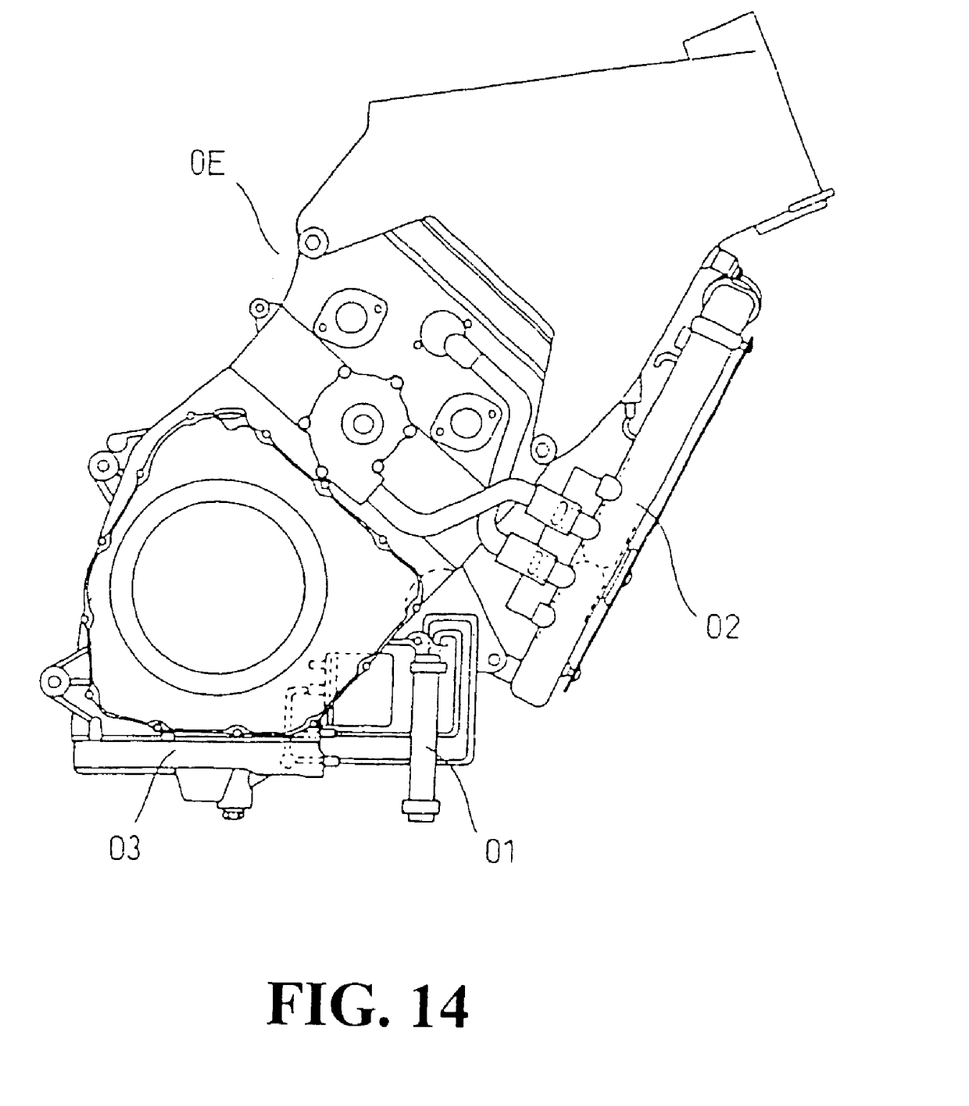
FIG. 14 is a view showing another embodiment of conventional disposition structure of the oil cooler to the internal combustion engine.

Also, even in the invention described in Japanese Utility Model Laid-Open No. Hei 1-176591, shown in FIG. 14, as in the case of the invention described in Japanese Patent No. 3206151, there has been described structure, in which the oil cooler 01 is installed below the radiator 02 and in the lower part forward of the engine 0E close to the oil pan 03; and a surface on which its multiplicity of cooling fins stand in a row is actually placed in a state in which it is perpendicular or substantially perpendicular to the vehicle advance direction. Thus, these cooling fins extend in a direction orthogonal to the vehicle advance direction and the fin surface of the cooling fins is made horizontal or substantially horizontal to the air flow.

In the invention described in the above-described Japanese Patent No. 3206151 (P. 3, FIG. 1-2), and Japanese Utility Model Laid-Open No. Hei 1-176591, disposition of the oil cooler which is the heat exchanger in either case, has such a relationship that the cooling fins extend in a direction orthogonal to the air flow during vehicle driving; thus the cooling fins are arranged with their fin surfaces parallel to or substantially parallel to, or inclined by a predetermined acute angle to the air flow. Setting of this opposition relationship of these cooling fins with respect to the air flow is appreciated in its own way from points of view of formation of a smooth flow in the air flow and securing of predetermined heat exchange efficiency because the air flow flows between the cooling fins without meeting with any resistance comparatively.

Since, however, the air flow flows away so as to stroke the surface of the cooling fins, the formation of a smooth flow in the air flow is not capable of applying a sufficient amount of air flow to the cooling fins, nor is sufficient cold given to the fin surface of the cooling fins, and in the sense that the cold of the air flow is more effectively absorbed to make the best use in the cooling fins, any acceptable result is never given. There is, however, room for improvement from a point of view of further improving the heat exchange efficiency in the heat exchanger.

Also, according to the above-described disposition structure of heat exchanger, since a plane having large area on which a multiplicity of cooling fins of the heat exchanger stand in a row opposes an air flow so as to intercept at right angles or substantially at right angles, its projected area is large, and a flow of the air flow to be directly applied to the engine is significantly affected leading to the decreased running air flow rate to be directly applied to the engine.

Therefore, the above-described disposition structure of heat exchanger is not appreciated from a point of view of cooling of the engine in above all air-cooled internal combustion engine.

Under such circumstances as described above, it would be desirable to improve the structure by a comparatively simple change in structure for further improving heat exchange efficiency of the heat exchanger in a motorcycle.

Such an improved structure would dispose the heat exchanger on the motorcycle in a manner that would allow a sufficient supply of air flow to be supplied to the cooling fins during vehicle driving, thus bringing about the maximum heat exchange efficiency.

SUMMARY AND OBJECTS OF THE INVENTION

An object of the present invention is to develop a disposition structure of the heat exchanger in a motorcycle for solving the above-described problems, and particularly concerning improvement in disposition structure of the heat exchanger in which a point of view has been laid on the improved cooling efficiency of the heat exchanger. To achieve this object, the present invention provides a disposition structure of the heat exchanger in a motorcycle equipped with: a front fork to be installed to a head pipe forward of a body frame; a front wheel to be supported by the front fork; an internal combustion engine to be arranged behind the front wheel; and the heat exchanger having cooling fins arranged between the internal combustion engine and the front wheel, characterized in that the heat exchanger concerned is disposed in order that the cooling fins may have such relationship that their fin surface becomes perpendicular or substantially perpendicular to an air flow that passes through between front forks and above the front wheel to go through the lower part of the internal combustion engine.

Also, the present invention is characterized in that the heat exchanger is provided in the upper part of a crankcase in the neighborhood, below a cylinder of the internal combustion engine.

Further, the present invention is characterized in that a pitch of the cooling fins in the heat exchanger is made larger in the central part, and smaller in the end portions.

Also, the present invention is characterized in that the heat exchanger is formed in a round shape.

In addition, the present invention is characterized in that a cylinder block above the heat exchanger is provided with cooling fins in a direction of the cylinder axis.

The present invention provides several advantages.

According to a first aspect of the present invention, since the heat exchanger is disposed in order that the cooling fins have such relationship that their fin surface becomes perpendicular or substantially perpendicular to an air flow that passes through between front forks and above the front wheel to go through the lower part of the internal combustion engine, the heat exchanger has been laid out to be perpendicular, when viewed from the vehicle side, to the air flow that passes through between front forks and goes through the lower part of the engine.

Therefore, by installing at an angle of the best efficiency with respect to a flow of the air flow of the motorcycle, it is possible to apply more air flow to the cooling fins of the heat exchanger for raising the cooling efficiency, and since an advance-guard projected area of the heat exchanger as viewed from the front of the vehicle can be reduced, a flow rate of the air flow to be conducted into the engine itself also increases, and it is possible to conduct the air flow to each of the heat exchanger and the engine. As a whole, the cooling property can be improved.

According to a second aspect of the present invention, since the heat exchanger has been provided in the upper part of a crankcase in the neighborhood below a cylinder of the internal combustion engine, an air flow that has changed its direction by striking against the cylinder and the cylinder head can be effectively introduced into the heat exchanger and be utilized.

According to a third aspect of the present invention, since a pitch of the cooling fins in the heat exchanger has been made larger in the central part, and smaller in the end portions, by widening the pitch in the central part of the heat exchanger, it is possible to restrain the air flow from being spread by the heat exchanger, and as a result, a lot of air flow can be caused to pass through the heat exchanger. Also, in the case of the air-cooled internal combustion engine, the air flow that has struck against the heat exchanger can be effectively introduced to the cooling fins and the like provided on the cylinder.

According to a fourth aspect of the present invention, since the heat exchanger has been formed in a round shape, the air flow that is going through sideways from the heat exchanger can be effectively used for cooling.

According to a fifth aspect of the present invention, since a cylinder block above the heat exchanger has been provided with cooling fins in a direction of the cylinder axis, the cylinder block is positively utilized as a wall against the air flow, whereby utilization efficiency of the air flow can be improved. In other words, the air flow that has struck against the cylinder block can be positively introduced toward the heat exchanger by the cooling fans directed toward the direction of the cylinder axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a view showing conventional disposition structure of the oil cooler to the internal combustion engine.

DETAILED DESCRIPTION OF THE PREFERRED EMBODIMENTS

The heat exchanger is disposed in order that the cooling fins of the heat exchanger may have such relationship that their fin surface becomes perpendicular or substantially perpendicular to an air flow that passes through between forks of the front fork to go through the lower part of the internal combustion engine.

A first embodiment of the present invention will be described with reference to FIGS. 1 to 12.

Figure 1:
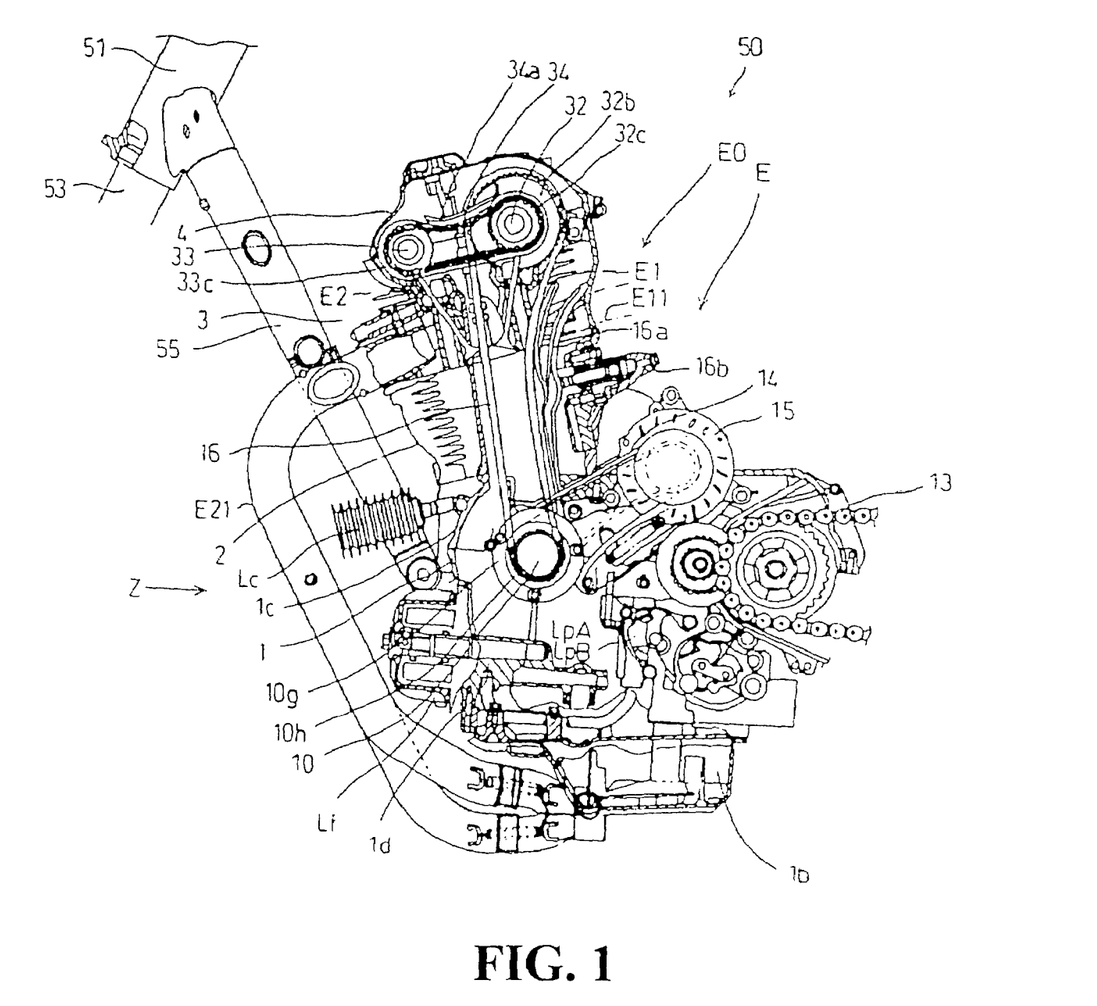
FIG. 1 shows an internal combustion engine shown in a side cross-sectional view, having characteristic oil cooler disposition structure according to the present invention, and a partial side of a vehicle on which the engine is mounted.

FIG. 1 shows partial structure of a motorcycle, which is a vehicle 50 on which an internal combustion engine E equipped with a heat exchanger according to the first embodiment is to be mounted, and in the figure concerned, only the structure in the neighborhood of a portion on which the engine E has been mounted is shown. The motorcycle has a head pipe 51 for forming a front part of its body frame, and the head pipe is provided with a front fork 53 (see FIG. 11) for supporting a front wheel 52 which is not shown in FIG. 1 in the lower part thereof, and a handlebar, not shown, mounted on the upper part thereof.

Main frame and down tube, not shown, are installed in the head pipe 51; seat rail and back stay, not shown, are installed in the main frame; and further a swing arm 58 for supporting a rear wheel is installed therein.

The body frame is mounted with an internal combustion engine E as described previously, in FIG. 1, the engine E is shown by a predetermined cross-sectional view in its side sight; for the engine E, a four-cycle parallel four-cylinder engine is adopted; this engine E has an overhead valve type twin cam mechanism (DOHC); when mounted onto a vehicle 50, it is arranged such that a head exhaust port E2 side of the cylinder E0 faces the running direction and the intake port E1 side faces upward on the right side; an intake pipe E11 extends from above a cylinder E0 upward on the right side; and this intake pipe E11 is connected to a carburetor and an air cleaner which are not shown. Also, the exhaust pipe 21 extends from the front side of the cylinder E0 toward the rear through below the vehicle body.

The lower part of the cylinder E0 of the engine E is placed on and fixed to the upper part of the crankcase 1, and the cylinder E0 is composed of: a cylinder block 2 directly coupled and fixed to the crankcase 1; a cylinder head 3, the lower part of which is coupled and fixed to the upper part of the cylinder block 2; and further a cylinder head cover 4 for covering the upper part of the cylinder head 3 and fixed to the head 3, and the structure is arranged by making these structural portions integral with one another by stud bolts and the like after all.

Figure 2:
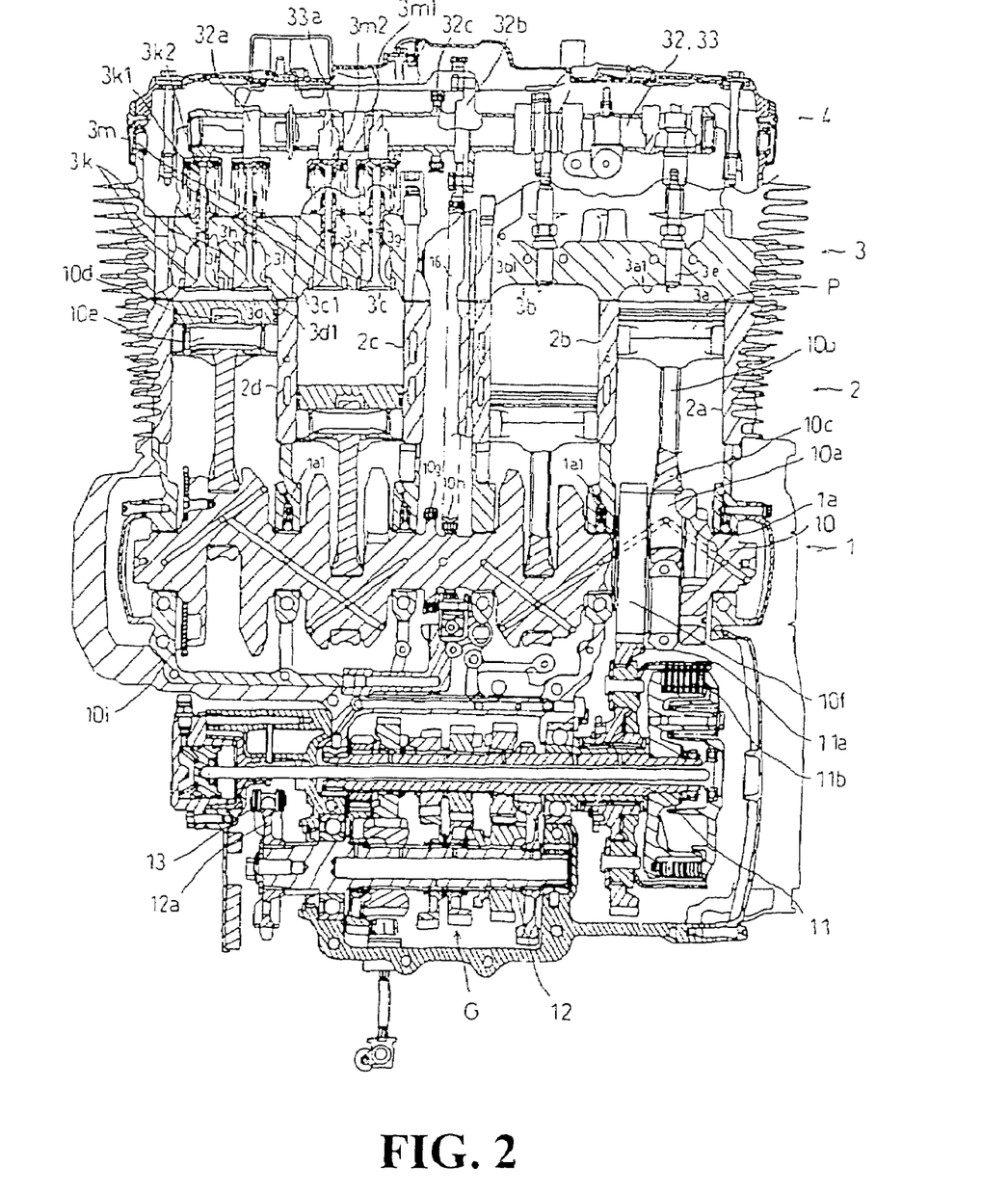
FIG. 2 is a view showing a major portion of the internal combustion engine according to the present invention.

On the crankcase 1, as shown in FIG. 2, a crankshaft 10 is rotatably supported; to crankpins 10a of the crankshaft 10 at four places, connecting rods 10b are mounted via their large ends 10c, respectively; and to small ends 10d of these connecting rods 10b, pistons P are mounted via piston pins 10e, respectively. Thus, these pistons P reciprocally slide within cylinder holes 2a to 2d formed in the cylinder block 2.

Also, to the crankshaft 10, a driving gear 10f is installed at a position close to right shown in the figure in the longitudinal direction; this gear 10f meshes with a driven gear 11a loosely fitted on the main shaft 11 of a transmission; a rotary driving force from the crankshaft 10 is transmitted from the driven gear concerned 11a to the main shaft 11 via an opening and closing clutch 11b; the rotation of the main shaft 11 is transmitted to a counter shaft 12 through selective gear meshing in a shift gear G; and the rear wheel which is a vehicle running driving wheel, not shown, is rotated via a driving chain 13 by a driving sprocket 12a.

On the crankshaft 10, there are provided two sprockets 10g, 10h having different diameters in parallel at a substantially central portion in the longitudinal direction; the large-diameter sprocket 10g is used to drive a generator 15 via a chain 14 (also see FIG. 1); and to the generator 15, there is connected a starting motor with coaxial relationship via an one-way clutch, not shown. Also, the small-diameter sprocket 10h is used to drive the camshaft by a chain 16 to be described later. Further, a pulser rotor 10i is installed at a position close to the left shown in the longitudinal direction of the crankshaft 10.

At the bottom below the crankcase 1, there is provided an oil pan 1b (see FIG. 1); substantially perpendicularly above the oil pan 1b, there are disposed oil pumps LpA, LpB; and the case 1 is provided with an oil filter Lf for filtering lubricating oil which receives discharged oil from the oil pumps LpA, LpB, an oil cooler Lc for returned oil which has been used to cool the engine, and the like.

In this respect, concerning characteristic disposition structure of the oil filter Lf and the oil cooler Lc to the case 1, an oil supply passage for lubrication and cooling to be disposed in the crankcase 1 and the cylinder E0, and the supply of oil using the supply passage, since the detailed description will be made later, the description is omitted here.

Figure 3:
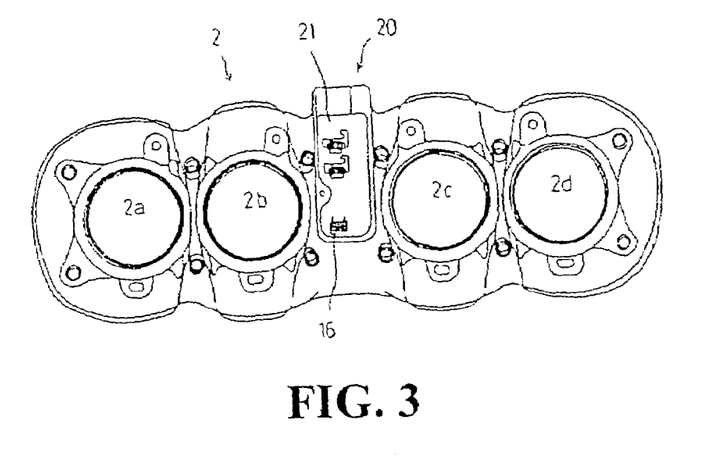
FIG. 3 is a plan view showing a cylinder block of the internal combustion engine according to the present invention.

On the upper part of the above-described crankcase 1, the cylinder block 2 is placed and fixed as described above. The cylinder block 2 is shaped like a long and substantially rectangular shape in a direction orthogonal to the back-and-forth direction of the vehicle 50 in the plane sight as shown in FIG. 3; there are arranged such four cylinder holes 2a to 2d as shown in parallel along its longitudinal direction; and within these cylinder holes 2a to 2d, the above-described pistons P are arranged so as to be able to reciprocally slide.

In a central part 20 of the cylinder block 2 in the longitudinal direction, there is formed a space portion 21, through which the above-described camshaft driving chain 16 passes; this space portion 21 penetrates the block 2 from top to bottom at a position slightly close to the rear in the widthwise direction of the block 2 of the central part 20 of the block 2 in the longitudinal direction thereof; and is shaped like a long and substantially rectangle in the widthwise direction in the plane sight of the cylinder block 2. Therefore, four cylinder holes 2a to 2d of the cylinder block 2 are arranged such that two each are spaced apart from each other right and left by the space portion 21 at the central part 20 of the block 2 in the longitudinal direction.

Figure 4:
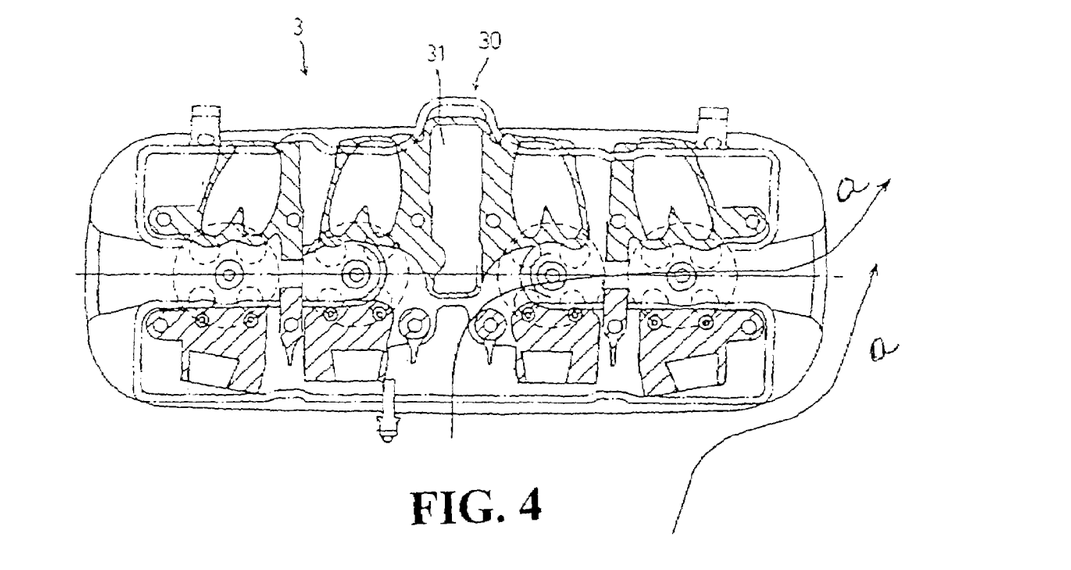
FIG. 4 is a plan view in a predetermined cross section of cylinder head showing the head of the internal combustion engine according to the present invention.

On the upper part of the cylinder block 2, there is fixed a cylinder head 3; the cylinder head 3 is shown in FIG. 4; the figure is a top view showing the cylinder head 3 in a predetermined cross section; as could be understood from this figure, the cylinder head 3 is shaped like a substantially rectangle as in the case of the cylinder block 2; as will be apparent by referring to FIG. 2, in the lower part thereof, there are four concave portions 3a1 to 3d1 corresponding to the four cylinder holes 2a to 2d in the cylinder block 2; and by upper portions of these concave portions 3a1 to 3d1 and respective cylinder holes 2a to 2d of the cylinder block 2, combustion chambers 3a to 3d are formed.

Each of the combustion chambers 3a to 3d is fitted with an ignition plug 3e so as to face the chamber; as shown in FIG. 2, in these combustion chambers 3a to 3d, there are opened intake ports and exhaust ports 3f, 3g respectively; to the intake/exhaust ports 3f, 3g, there communicate intake/exhaust passages 3h, 3i; the intake passage 3h is fitted with a fuel injection system which is not shown in the figure; and further, a valve train composed of intake/exhaust valves $3k$, $3m$ for opening and closing the intake/exhaust ports $3f$, $3g$ in these combustion chambers $3a$ to $3d$ and two camshafts having cams for opening and closing these intake/exhaust valves $3k$, $3m$, and the like are arranged in a structural portion of the cylinder head 3.

In the above-described top view showing the cylinder head 3 as shown in FIG. 4, there is provided a space portion 31 for the above-described camshaft driving chain 16 which, in a central part 30 of the cylinder head 3 in the longitudinal direction, is located close to the rear in the widthwise direction, and which penetrates the head 3 having predetermined width and length from top to bottom; the position of this space portion 31 is matched to that of a space portion 21 for the chain 16 provided on the cylinder block 2; and in a joining portion between the cylinder head 3 and the cylinder block 2, shapes of opening of the space portions 21, 31 are arranged to have conformity to each other.

Therefore, as shown in FIG. 1, the camshaft driving chain 16 for passing through the space portions 21, 31 has been arranged so as to be able to pass from the crankshaft 10 to the upper part of the cylinder head 3 without hindrance. In this respect, in FIG. 1, reference symbol $16a$ designates a chain tensioner; and $16b$, a damper for adjusting the tension of the chain tensioner. Also, one to be indicated by an arrow "a" in FIG. 4 is a flow of air flow during vehicle driving.

The above-described valve train is, as could be understood by referring to FIGS. 1, 2 and the like, straightforwardly comprised of a valve operating mechanism including: two camshafts 32, 33 having a plurality of cams $32a$, $33a$; a driving mechanism for driving these camshafts 32, 33; lifters $3k2$, $3m2$ for intake/exhaust valves $3k$, $3m$ for abutting against the cams $32a$, $33a$ to press their valve stems $3k1$, $3m1$, and the like.

These two camshafts 32, 33 are rotatably supported by the bearings in the upper part of the cylinder head 3, and at predetermined intervals in the longitudinal direction so as to intersect at right angles the advance direction of the vehicle 50, and yet with positional relationship in parallel to each other; and the cams $32a$, $33a$ (see FIG. 2), which these camshafts 32, 33 have respectively, are caused to abut against the valve lifters $3k2$, $3m2$ in order to open and close the intake/exhaust valves $3k$, $3m$ as described above.

Therefore, these cams $32a$, $33a$ are disposed on the camshafts 32, 33 correspondingly to the upper ends of the valve stems $3k1$, $3m1$ of each intake/exhaust valve $3k$, $3m$; in the present embodiment, the camshaft 32 of the vehicle 50 on the rear side is a camshaft 32 in which an opening/closing cam $32a$ of the intake valve $3k$ is to be disposed; the camshaft 33 on the front side is a camshaft 33 in which an opening/closing cam $33a$ of the exhaust valve $3m$ is to be disposed; as shown in FIG. 2, in each combustion chamber $3a$ to $3d$, two intake valves $3k$ and two exhaust valves $3m$ are disposed respectively; and therefore, eight cams $32a$, $33a$ are disposed on these two camshafts 32, 33, respectively.

Thus, as shown in FIG. 1, of two camshafts 32, 33 arranged on the upper part of the cylinder head 3 described above, to the rear camshaft 32, a rotary driving force from the crankshaft 10 is transmitted; this driving force is transmitted by the camshaft driving chain 16 laid over between the sprocket $10h$ of the crankshaft 10 and the sprocket $32b$ of the camshaft 32. The driving force transmitted to the rear camshaft 32 is further transmitted to the front camshaft 33; and this driving force is transmitted by the between-camshafts driving chain 34 laid over between the sprocket $32c$ of the rear camshaft 32 and the sprocket $33c$ of the front camshaft 33.

In an operation of the internal combustion engine E, therefore, a rotary driving force of the crankshaft 10 is transmitted to both camshafts 32, 33 respectively via the camshaft driving chain 16 and the driving chain 34 between camshafts. By rotation of the cams $32a$, $33a$ synchronized with the rotation of the crankshaft 10 due to the rotation of the both camshafts 32, 33, an opening and closing operation of the intake/exhaust valve $3k$, $3m$ is performed in synchronization with ascent and descent of the piston P as is generally known through pushing movement of the above-described valve lifters $3k2$, $3m2$ and valve stems $3k1$, $3k2$ and air intake/exhaust in combustion within the engine is performed.

Figure 5:
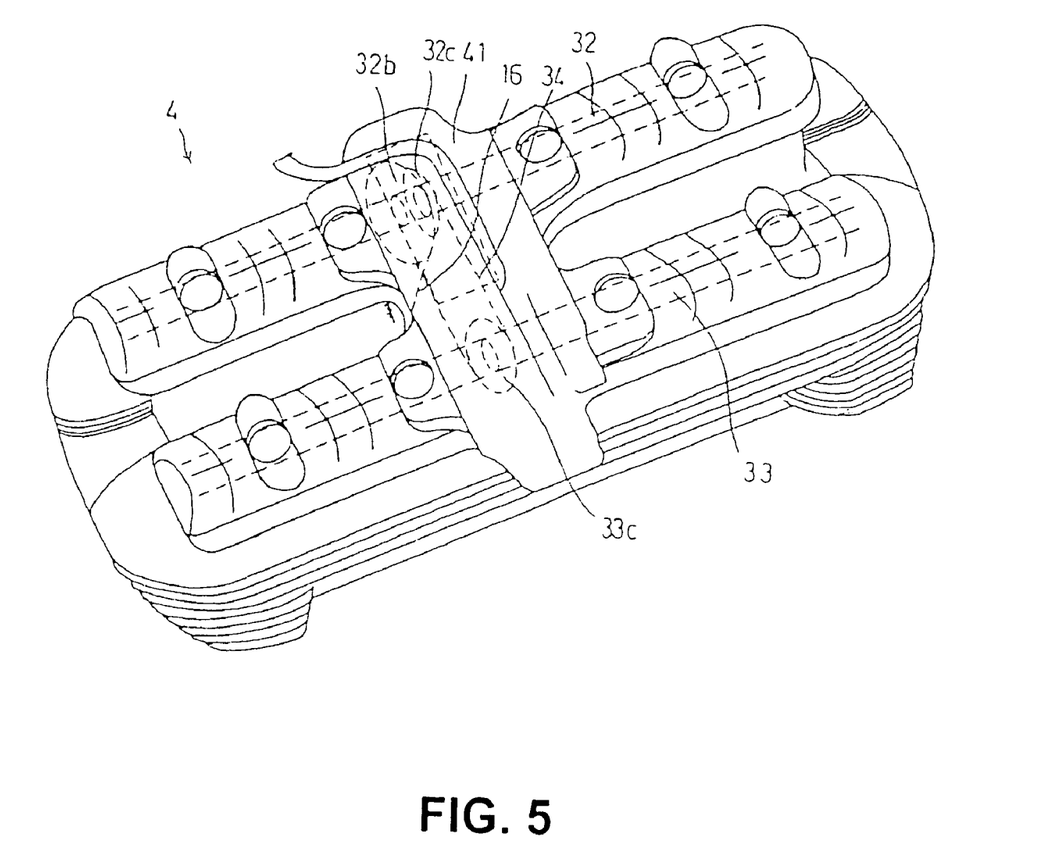
FIG. 5 is a perspective view showing a cylinder head cover of in the internal combustion engine according to the present invention.

The upper part of the cylinder head 3 is covered with a cylinder head cover 4, and the cylinder head cover 4 has, as shown in the perspective view of FIG. 5, substantially rectangular structure which is long in a direction orthogonal to the vehicle advance direction, as in the case of the cylinder head 3 to be covered with the cover 4. This cover 4 covers two camshafts 32, 33 (shown in dotted line) from above substantially completely, and the upper part of space in which sprockets $32b$, $32c$, $33c$ to be installed to a substantially central portion of the camshaft 32, 33 in the longitudinal direction are accommodated and the chains 16, 34 move is covered with a chain cover 41 which is to be arranged as separate structure.

Therefore, the chain cover 41 actually crosses the central part of the cylinder head cover 4, and the cylinder head cover 4 is, as a whole, shaped like a substantially H-character shaped exterior shape shown in FIG. 5 in its plane sight.

A motorcycle according to an embodiment of the present invention and structure of an engine to be installed onto the motorcycle are generally as described above.

The description will be made of the oil cooler Lc which is the above-described heat exchanger to be installed to the internal combustion engine E according to the present invention, an outline of structure of the oil filter Lf and its characteristic disposition structure to the engine E, and also supply structure of lubricating oil and cooling oil in the engine E including this oil cooler Lc and oil filter Lf.

Figure 6:
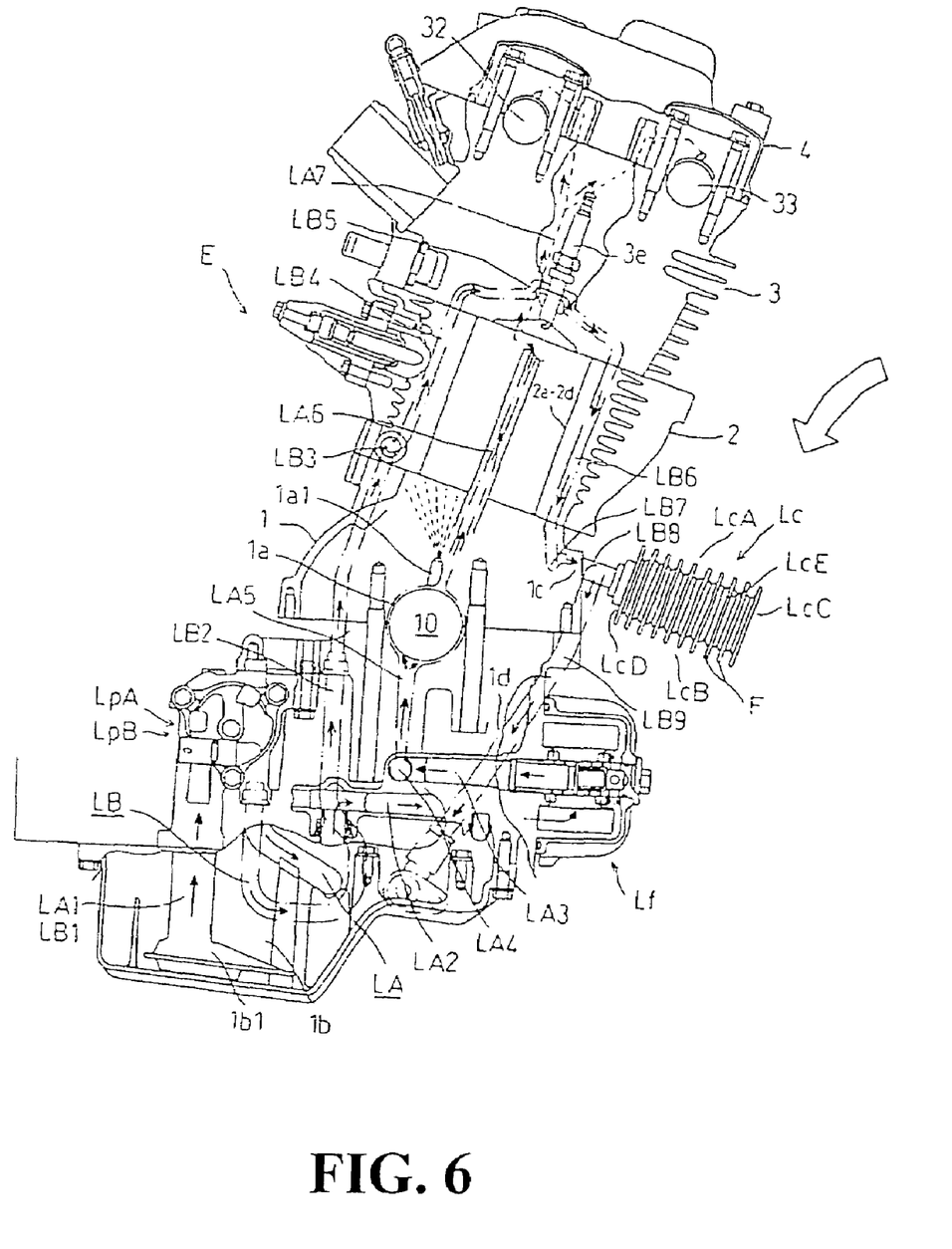
FIG. 6 is a view showing structure of an oil supply passage in the internal combustion engine according to the present invention.
Figure 8:
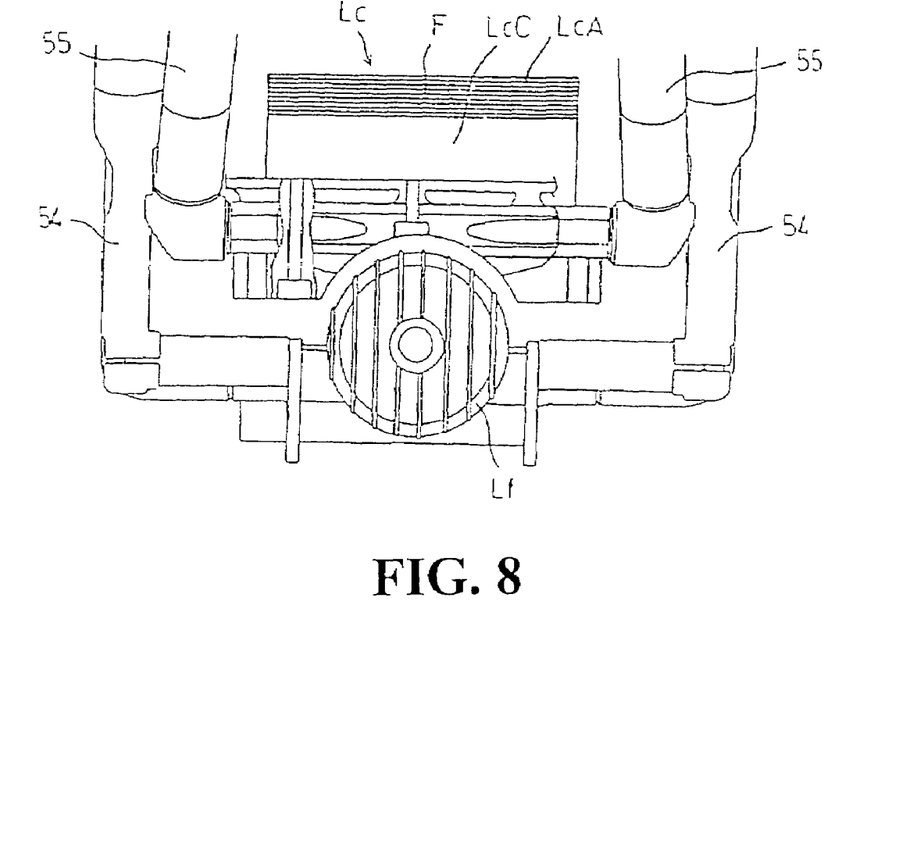
FIG. 8 is a view showing disposition structure of an oil cooler and an oil filter in the internal combustion engine according to the present invention, and a view viewed in a direction indicated by an arrow Z in FIG. 1.
Figure 10:
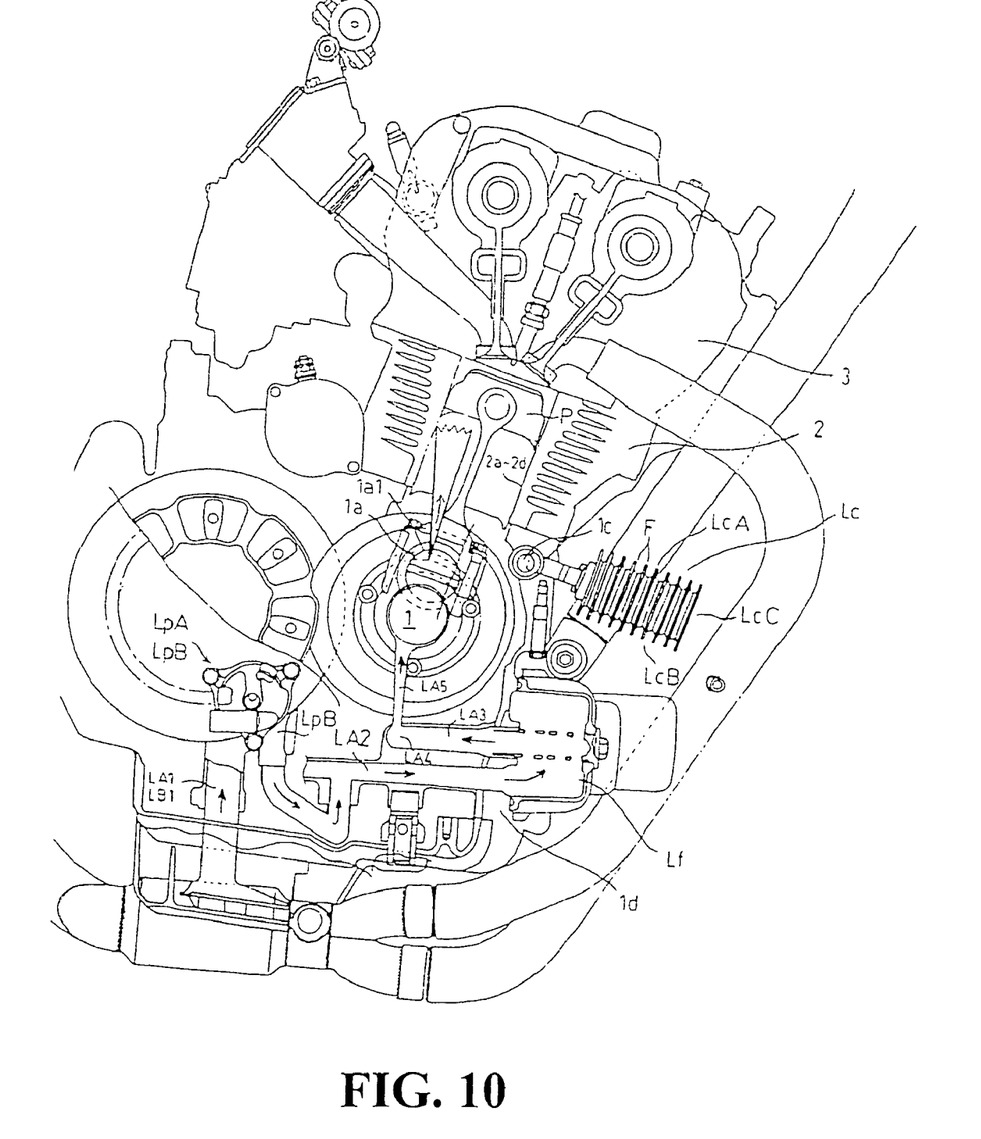
FIG. 10 is a side cross-sectional view for the internal combustion engine in which partial structure of the oil cooler, the oil filter and the oil supply passage is clearly shown.

The oil cooler Lc and the oil filter Lf are, as shown in FIGS. 1, 6 and the like, both installed to the front side of the engine E toward the advance direction of the vehicle 50; more specifically, the oil cooler Lc, which is a heat exchanger, is installed to a front-side center $1c$ on the upper part of the crankcase 1; the oil filter Lf is installed to a front-side center $1d$ of the lower part of the crankcase 1; the oil cooler Lc and the oil filter Lf are arranged to have up-and-down relationship with each other when viewed from the front of the vehicle 50; and the oil cooler Lc is arranged so as to be located just above the oil filter Lf vertically (see FIGS. 8, 10 and 11).

The oil cooler Lc has, as will be apparent by referring to FIGS. 6, 8, 9, 10 and the like, an exterior shape of a rectangular parallelepiped having two large surfaces LcA, LcB, which oppose to each other, opposite surfaces LcC, LcD which make a long pair narrow in width for opposing to each other, and opposite surfaces LcE, LcF which make a short pair narrow in width; on those two large surfaces LcA, LcB, which oppose to each other, has a plurality of cooling fins F which have been arranged in parallel at equal spaces in parallel to one another over the substantially entire surface in those surfaces; and these cooling fins F extend with have the above-described relationship along the longitudinal direction of those two large surfaces LcA, LcB.

As shown in FIG. 8, the oil cooler Lc extends in the lateral direction such that its longitudinal direction actually crosses between the down tubes 55 of the body frame. In other words, the oil cooler Lc extends between the down tubes 55 which make the pair toward a direction in which its longitudinal direction intersects at right angles the back-and-forth direction of the vehicle 50 and yet, is arranged such that those two large surfaces LcA, LcB with their cooling fins F provided are placed up or down; and the one surface LcD long and narrow in width which makes the pair is fixed at the center 1c of the front side above the crankcase 1, whereby the oil cooler Lc is installed to the front of the engine E (see FIG. 6).

Therefore, cooling fins F of the oil cooler Lc are positioned as structure in which on those two large surfaces LcA, LcB which have been arranged up or down, a plurality of the cooling fins F have been actually arranged to extend in parallel to one another in a direction orthogonal to the back-and-forth direction of the vehicle 50. The oil cooler Lc is installed such that as shown in FIGS. 6, 8, 9, 10 and the like with the disposition structure of these cooling fins F, it points substantially horizontally in a longitudinal direction of the long side LcC, LcD narrow in width in the rectangular parallelepiped, more specifically, such that the oil cooler Lc protrudes from the front-side center 1c on the upper part of the crankcase 1 of the engine E with the front side slightly lowering toward the front of the vehicle 50 with the one side LcC long and narrow in width in front.

Figure 11A:
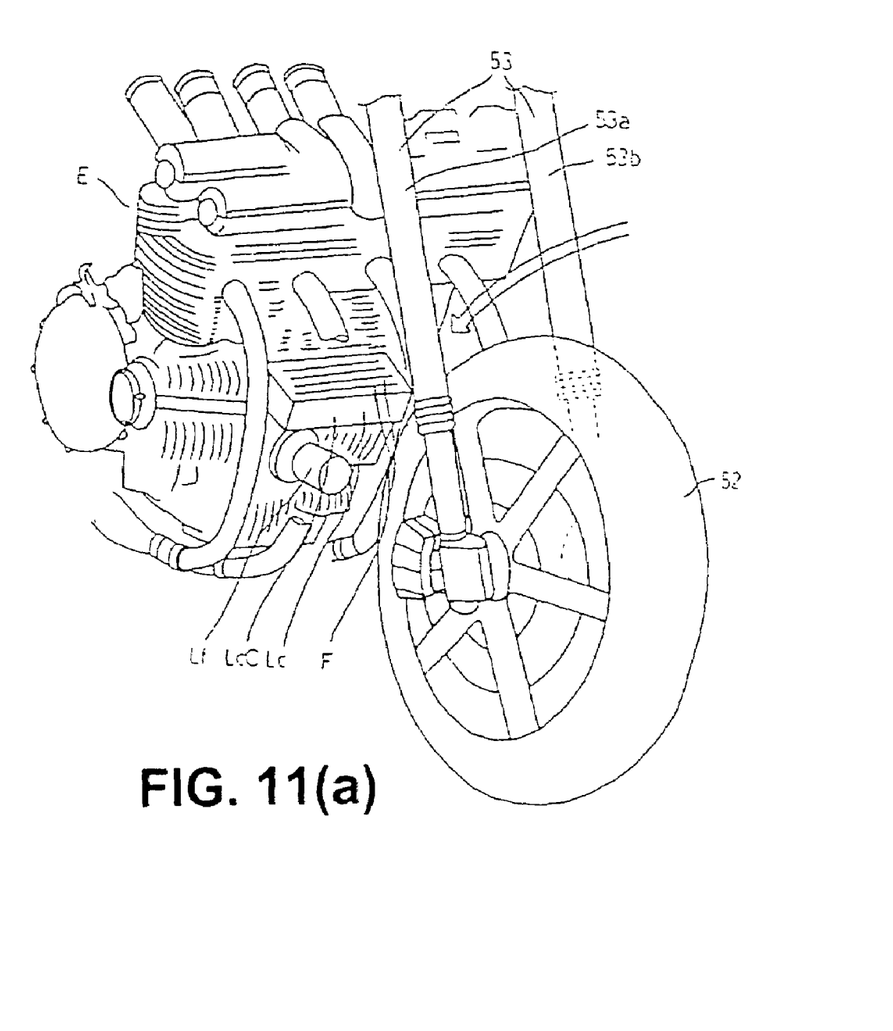
FIG. 11(a) is a perspective view obtained by viewing a motorcycle according to the present invention from the front, in which disposition condition of the oil cooler to the engine is explained.

As shown in FIG. 11(a), the oil cooler Lc to be arranged between the down tubes 55 (omitted in FIG. 11(a)) which make a pair in the body frame has the relationship in which when viewed from the front of the vehicle 50, it is just located between forks 53a and 53b which make the pair in the front fork 53 for supporting the front wheel 52, and an air flow "a" that goes through between the forks 53a, 53b during traveling of the vehicle 50 for flowing below the engine E directly flows toward the oil cooler Lc.

Therefore, the oil cooler Lc is cooled by the air flow "a" exceedingly effectively, and yet, since there has been adopted the disposition structure in which the fin surface of the cooling fins F of the oil cooler Lc extend in a direction to intersects at right angles the back-and-forth direction of the vehicle 50; that is, since there has been adopted such disposition structure that the fin surface of the cooling fins F actually becomes perpendicular or substantially perpendicular to the flow of the air flow "a," the cooling effect is further improved.

Also, the oil filter Lf is, as will be apparent from FIGS. 1, 6, 11(a) and the like, substantially cylindrical as its exterior shape, and on disposing the oil filter Lf to the lower part of the crankcase 1, the oil filter Lf is arranged to protrude from the front-side center 1d of the lower part of the crankcase 1 which has deviated slightly downward from space between the down tubes 53a, 53b, which make a pair, toward the front of the vehicle 50, and the cylindrical oil filter Lf protrudes just below the oil filter Lc vertically although it has been described already. In this respect, as regards the internal structure of the oil cooler Lc and the oil filter Lf, it has been conventionally known, and since it is not especially characteristic, the description is omitted.

The structure of supply passages of lubricating oil and cooling oil including the oil cooler Lc and the oil filter Lf and lubrication and cooling of the engine E due to these oil supply passages are generally as described below.

Figure 9:
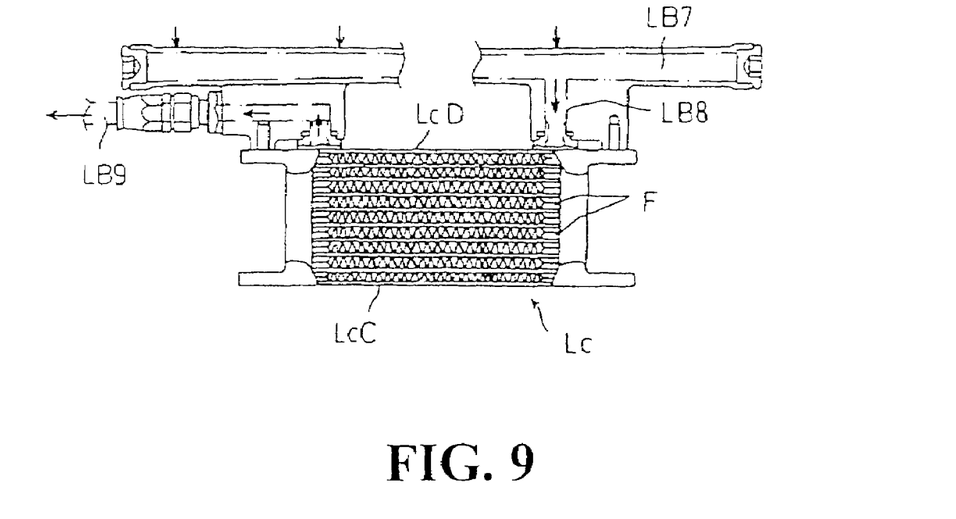
FIG. 9 is a view when the oil cooler according to the present invention has been viewed from the plane, and shows combination relationship of the oil cooler to the oil supply passage.

At the bottom below the crankcase 1 of the internal combustion engine E according to the present embodiment, there is provided the oil pan 1b as shown in FIGS. 1, 6, 9 and the like, and as described already; just above this oil pan 1b, more specifically, in the upper part substantially vertically, there are disposed two oil pumps LpA, LpB; and a suction port of this oil pump LpA, LpB is coupled to a strainer 1b1 to be immersed in oil within the oil pan 1b via an oil suction pipe LA1, LB1 extending downward respectively. To each discharge port of the oil pumps LpA, LpB, an oil supply passage LA, LB is coupled, and two oil supply systems are actually constituted by these passages LA, LB.

Figure 7:
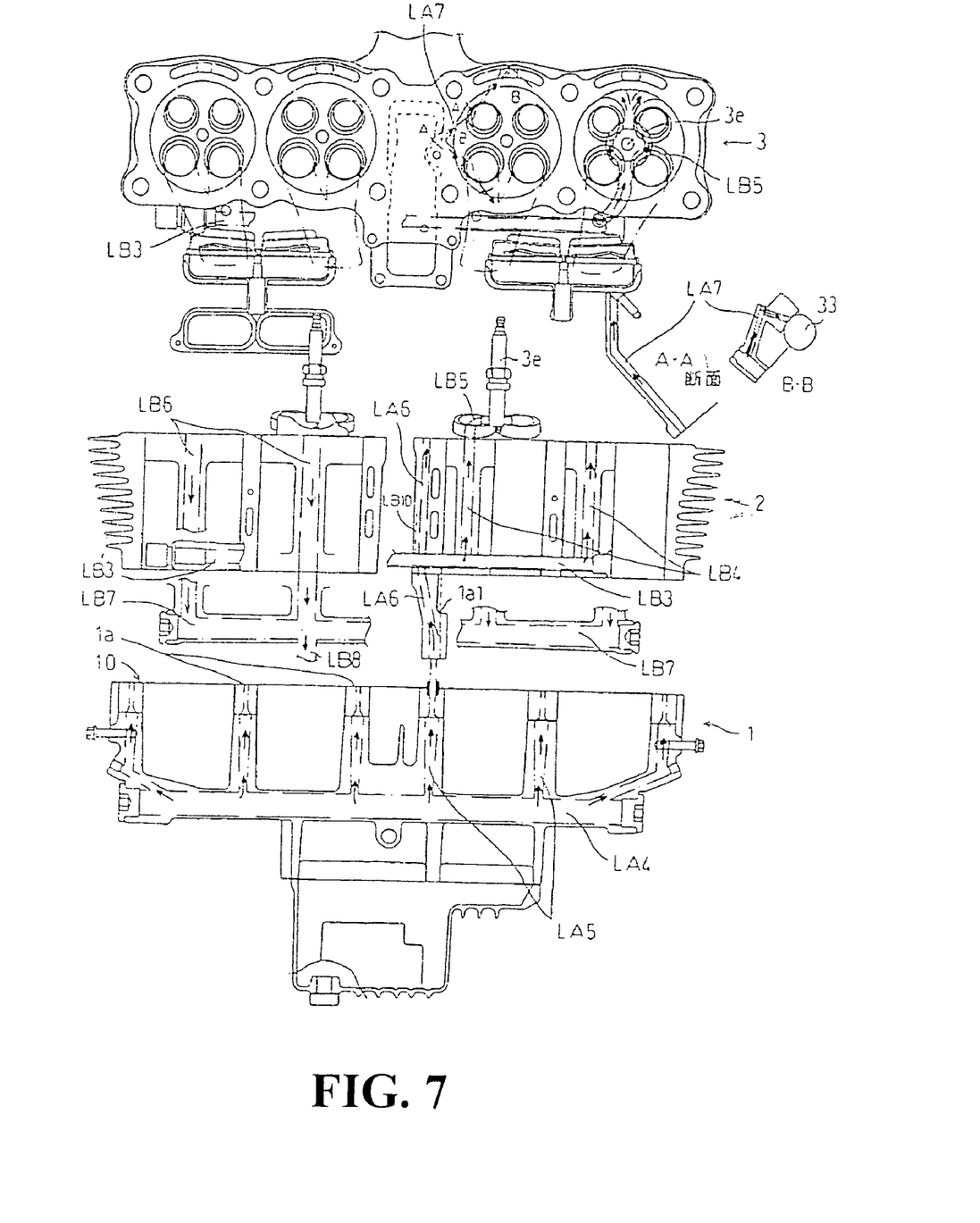
FIG. 7 is a view for explaining the oil supply passage in the internal combustion engine according to the present invention.

Their one oil supply system is a supply passage for lubricating oil to be used for lubrication of the engine E at each place, and the passage consists of an oil supply passage LA as could be understood by referring to FIGS. 6, 7 and 10, and has: a passage LA2 for communicating the discharge port of the pump LpA to an oil inlet of the oil filter Lf; a passage LA3 for communicating to a main gallery LA4 for extending an oil outlet of the oil filter Lf along the longitudinal direction of the crankshaft 10 under a crankshaft 10; six oil supply passages LA5 for communicating this main gallery LA4 to positions corresponding to six journals 1a of the crankshaft 10 one another; and four injection holes 1a1 provided on a predetermined journal 1a for directly injecting the lubricating oil in the journal 1a of the crankshaft 10 toward the inner walls of four cylinder holes 2a to 2d (see also FIG. 2).

Thus, there are provided four passages LA6 (see FIG. 7) which pass through between the cylinder holes 2a to 2d of the cylinder block 2 for communicating a predetermined journal 1a of the crankshaft 10 to four oil supply passages LA7 for lubricating the valve system such as the cams 32a, 33a and the camshafts 32, 33. In this respect, in FIG. 7, only one oil supply passage LA7 is shown and the others are omitted. The passage LA7 is to be provided correspondingly to each of those four cylinders.

Also, the other oil supply system is a supply passage of cooling oil to be used for cooling of the engine E, the passage consists of an oil supply passage LB as could be understood by referring to FIGS. 6, 7, and has: a passage LB2 for communicating the discharge port of the oil pump LpB to an oil supply gallery LB3 for extending along the longitudinal direction of the block 2 in the lower part of the cylinder block 2 on the intake side; and four passages LB4 for communicating to inlets of four annular passages LB5 formed on an ignition plug installation portion above each of four combustion chambers 3a to 3d by passing through, on the intake side of the cylinder block 2, in its vertical direction from the oil supply gallery LB3. In this respect, in FIG. 7, only one annular passage LB5 is shown, and the others are omitted.

Further, the other oil supply system has: four passages LB6 for communicating an outlet of the above-described annular passages LB5 to an oil discharge gallery LB7; a short passage LB8 for communicating the oil discharge gallery LB7 to a return oil receiving port of the oil cooler Lc; and a return oil passage LB9 for connecting the outlet of the oil cooler Lc to the oil pan 1b, and the oil supply gallery LB3 has also a small oil supply passage LB10 to the cam chain 16 (see FIG. 7).

Next, the description will be made of supply of oil for lubrication and cooling in the engine E due to the above-described oil supply passages LA, LB.

First, as regards supply of oil for lubrication in the engine E through the one oil supply system, by an operation of the pump oil LpA relating to an operation of the engine E, the lubricating oil within the oil pan 1b is sucked up by the oil pump LpA via the strainer 1b1 and an oil suction pipe LA1; the lubricating oil sucked up within the pump LpA is fed under pressure from a pump discharge port with the pump pressure raised; and this oil fed under pressure is fed to the oil filter Lf via a passage LA2 for communicating the oil pump LpA to the oil filter Lf.

The lubricating oil entered the oil filter Lf is filtered by the filter Lf; after metallic pieces, dust and the like mixed into the oil are removed, the lubricating oil is fed into the main gallery LA4 under pressure; is fed from here to each journal 1a of the crankshaft 10, the bearing portion of the connecting rod 10b and the like via six passages LA5 under pressure to be used for lubricating these portions; is supplied to four supply passages LA7 to the valve system such as the cams 32a, 33a and the camshafts 32, 33 for extending upward within the cylinder head 3 via those four passages LA6 within the cylinder block 2; and each portion in the valve system is lubricated efficiently.

Also, a part of the lubricating oil is directly injected from an injection portion 1a1 provided on a predetermined journal 1a of the crankshaft 10 toward the inner walls of the cylinder holes 2a to 2d (see FIGS. 2, 6), and a sliding portion and the like between the inner walls and the piston rings are effectively lubricated. Thus, the oil used for lubricating each of these portions of the engine E flows along the inner walls and the like of the engine E as oil drops, and directly drops within the oil pan 1b at the lower part below the crankcase 1.

Also, as regards supply of oil for cooling in the engine E through the other oil supply system, the cooling oil is discharged and fed under pressure from the oil pump LpB via a process similar to the foregoing; the oil is supplied the oil supply gallery LB3 for extending along the longitudinal direction of the cylinder block 2 below the intake side of the engine E via the passage LB2; and is supplied within an annular oil supply passage LB5 for surrounding the ignition plug 3e within an ignition plug installation seat of each of four combustion chambers 3a to 3d from the oil supply gallery LB3 via four passages LB4 of the cylinder block 2 on the intake side (see FIGS. 6, 7). By supplying this cooling oil, the installation seat of the ignition plug 3e and its neighborhood are effectively cooled.

Thus, the above-described cooling oil which has passed through within those four annular oil supply passages LB5 within the installation seat of the ignition plug 3e crosses the ignition plug 3e installation seat below the cylinder head 3; reaches the oil discharge gallery LB7 of upper part of the crankcase 1 on the exhaust side via four return passages LB6 of the cylinder block 2 on the exhaust side; becomes return oil which enters the oil cooler Lc from here via the short passage LB8; and after cooled in the oil cooler Lc, is returned within the oil pan 1b via the return oil passage LB9. Also, in this oil supply process, lubrication in the cam chain 16 is performed through the small oil supply passage LB10 from the oil supply gallery LB3 (see FIG. 7).

In the above-described first embodiment according to the present invention, above all with the provision of characteristic disposition structure of the oil cooler Lc to the vehicle 50 or the engine E, the side LcC long and narrow in width which the cooler Lc intersects at right angles is caused to oppose to the air flow "a" that goes through between forks 53a, 53b of the front fork and flows below the engine E during traveling of the vehicle 50, and yet the side LcC points to slightly descend forward. Therefore, a multiplicity of cooling fins F to be disposed actually in parallel along the long side LcC of the cooler Lc are disposed such that their fin surface becomes perpendicular or substantially perpendicular to the air flow "a", and the air flow "a" can be directly applied to the large fin surface of the cooling fins F effectively. Accordingly, it becomes possible to effectively absorb cold of the air flow, and the heat exchange function in the oil cooler Lc is greatly improved (see FIG. 11(a)).

Also, since the oil cooler Lc has disposition structure in which the side LcC long and narrow in width is caused to oppose to the running direction of the vehicle, an advance-guard projected area of the oil cooler Lc as viewed from the front of the vehicle 50 can be reduced, and irrespective of the existence of the cooler Lc in protruding arrangement in front of the engine E, the air flow "a" of a sufficient amount is directly conducted into the engine E, and therefore, the cooling efficiency of the engine E can be improved (see FIG. 11(a)).

Further, since the oil cooler Lc has been disposed on the upper part of the crankcase 1 in the neighborhood below the cylinder E0 of the internal combustion engine E, the air flow "a" that collides with the cylinder block 2 or the cylinder head 3 to change its direction can be effectively taken into the oil cooler Lc and utilized, and therefore, the oil cooler Lc exhibits an operating effect capable of further improving the heat exchange efficiency in the oil cooler Lc among others.

Figure 12:
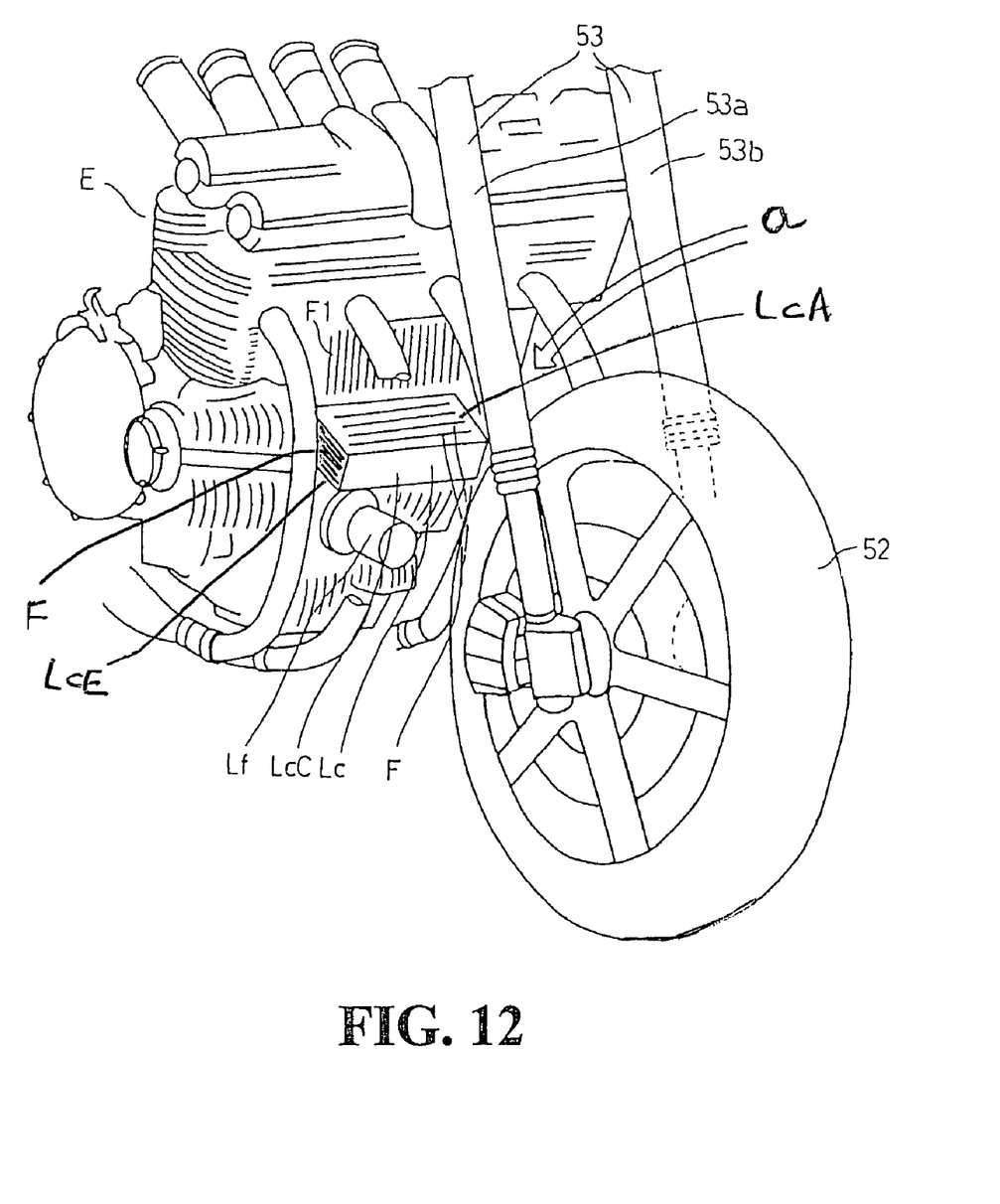
FIG. 12 is a view similar to FIG. 11 showing another embodiment of the present invention.

In the first embodiment of the present invention, the cooling fins F1 in the cylinder block 2 above the heat exchanger are provided in a direction perpendicular to the axial direction of the cylinder, that is, to point in a horizontal or a substantially horizontal direction (see FIGS. 2, 6, 11(a) and the like), whereas in this second embodiment, as shown in FIG. 12, the cooling fins F1 in the cylinder block 2 above the heat exchanger are provided in parallel or substantially in parallel to the axial direction of the cylinder, that is, to point in a vertical or substantially vertical direction.

According to the structure of this second embodiment, in addition to the operating effect in the first embodiment, the cylinder block 2 can be positively utilized as a wall against the air flow, and therefore, the utilization efficiency of the air flow is improved. In other words, the air flow that has struck against the cylinder block 2 can be positively introduced toward the heat exchanger by the cooling fins F1 pointing to the cylinder axial direction.

In such an air-cooled internal combustion engine as described in the present first or second embodiment, cooling between the cylinder bores and in the neighborhood of the plug seat may be hindered when a heat exchanger is arranged in front of the internal combustion engine. However, such a cooling mechanism can be effectively utilized by means of the structure in the above-described first or second embodiment according to the present invention.

In this respect, in the above-described first or second embodiment, the multiplicity of cooling fins F of the oil cooler Lc have been provided at equal pitches, but the present invention is not limited thereto as a matter of course, but the pitch can be appropriately selected, and for example, the pitch of the cooling fins F in the oil cooler Lc is selected such that it is made large in the central part LcA, LcB while it is made small at the end portions LcE, LcF, whereby taking-in of the air flow that directly strikes against the oil cooler Lc is improved, and dispersion of the air flow by collision with the cooler Lc is restricted. As a result, an air flow rate of the air flow that passes through the cooler Lc can be increased.

Figure 11B:
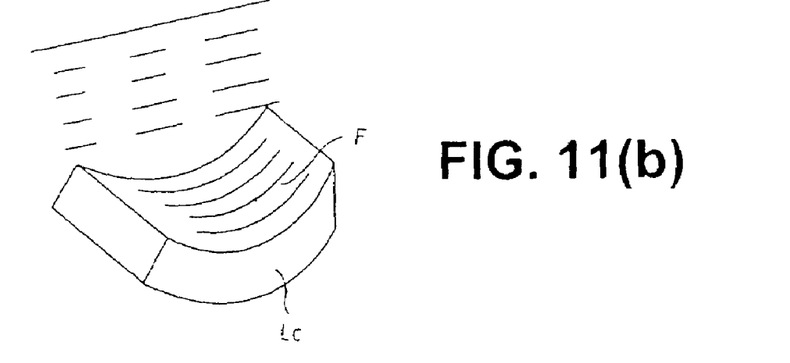
FIG. 11(b) is a view showing another oil cooler to be disposed in the engine.

Also, although the exterior shape of the oil cooler Lc in the first or second embodiment has been made into a square shape of the rectangular parallelepiped, the present invention is not limited thereto; however, for example, it is possible to make it into Such a round shape as shown in FIG. 11(b) by entirely giving roundness. If this shape is selected, the air flow that is going through at the side of the oil cooler Lc can more effectively be used for cooling in the cooler Lc.

An internal combustion engine equipped with disposition structure of the oil cooler Lc and the oil filter Lf according to the first or second of the present invention can be applied to not only the motorcycle, but also other similar vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disposition structure of a heat exchanger in a motorcycle equipped with: a front fork connected to a head pipe forward of a body frame; a front wheel to be supported by said front fork; an internal combustion engine to be arranged behind said front wheel; and said heat exchanger having cooling fins arranged between said internal combustion engine and said front wheel, wherein said heat exchanger is disposed in order that said cooling fins are arranged so that fin surfaces thereof are substantially perpendicular to an air flow that passes between said front forks and above said front wheel, and then goes through a lower part of said internal combustion engine, and wherein the heat exchanger is mounted on a crankcase and extends forwardly between a pair of down tubes.

2. The disposition structure of a heat exchanger in a motorcycle according to claim 1, wherein said heat exchanger is provided in an upper part of a crankcase, in a position adjacent to and below a cylinder of the internal combustion engine.

3. The disposition structure of a heat exchanger in a motorcycle according to claim 2, wherein a pitch of the cooling fins in a central part of said heat exchanger is made larger than a pitch of the cooling fins in end portions of said heat exchanger.

4. The disposition structure of a heat exchanger in a motorcycle according claims 2, wherein the cooling fins of said heat exchanger are disposed on at least two large surfaces of the heat exchanger, the heat exchanger being arranged such that the cooling fins on the two large surfaces project up or down.

5. The disposition structure of a heat exchanger in a motorcycle according to claim 1, wherein a pitch of the cooling fins in a central part of said heat exchanger is made larger than a pitch of the cooling fins in end portions of said heat exchanger.

6. The disposition structure of a heat exchanger in a motorcycle according claims 1, wherein said heat exchanger has a curved shape.

7. The disposition structure of a heat exchanger in a motorcycle according claims 1, wherein said heat exchanger has a substantially rectangular shape.

8. The disposition structure of a heat exchanger in a motorcycle according claim 1, wherein a cylinder block above said heat exchanger is provided with cooling fins in a direction of a cylinder axis.

9. A disposition structure of a heat exchanger in a motorcycle comprising:

a front fork connected to a head pipe forward of a body frame; a front wheel to be supported by said front fork; an internal combustion engine to be arranged behind said front wheel; and said heat exchanger having cooling fins arranged between said internal combustion engine and said front wheel, wherein said heat exchanger is disposed in order that said cooling fins are arranged so that fin surfaces thereof are substantially perpendicular to an air flow that passes between said front forks and above said front wheel, and then goes through a lower part of said internal combustion engine, and wherein the heat exchanger is mounted on a crankcase and extends forwardly beyond a forward edge of a cylinder block of the engine.

10. A motorcycle with a disposition structure for a heat exchanger, comprising:

a front fork connected to a head pipe forward of a body frame;

a front wheel to be supported by said front fork;

an internal combustion engine connected to a pair of down pipes arranged behind said front wheel; and cooling fins of said heat exchanger, the heat exchanger being arranged between said internal combustion engine and said front wheel, wherein said heat exchanger is disposed so that fin surfaces of said cooling fins are substantially perpendicular to an air flow that passes between said front forks and above said front wheel, and then goes through a lower part of said internal combustion engine, the heat exchanger having a width dimension greater than a height dimension, the width dimension being less than a distance between the pair of down pipes.

11. The disposition structure of a heat exchanger in a motorcycle according to claim 10, wherein said heat exchanger is provided in an upper part of a crankcase, in a position adjacent to and below a cylinder of the internal combustion engine.

12. The disposition structure of a heat exchanger in a motorcycle according to claim 11, wherein a pitch of the cooling fins in a central part of said heat exchanger is made larger than a pitch of the cooling fins in end portions of said heat exchanger.

13. The disposition structure of a heat exchanger in a motorcycle according claims 11, wherein the cooling fins of said heat exchanger are disposed on at least two large surfaces of the heat exchanger, the heat exchanger being arranged such that the cooling fins on the two large surfaces project up or down.

14. The disposition structure of a heat exchanger in a motorcycle according to claim 10, wherein a pitch of the cooling fins in a central part of said heat exchanger is made larger than a pitch of the cooling fins in end portions of said heat exchanger.

15. The disposition structure of a heat exchanger in a motorcycle according claims 10, wherein said heat exchanger has a curved upper and lower surface.

16. The disposition structure of a heat exchanger in a motorcycle according claims 10, wherein said heat exchanger has a substantially rectangular shape.

17. The disposition structure of a heat exchanger in a motorcycle according claim 10, wherein a cylinder block above said heat exchanger is provided with cooling fins in a direction of a cylinder axis.

18. The disposition structure of a heat exchanger in a motorcycle according claim 10, wherein the heat exchanger is mounted on a crankcase and extends forwardly between the pair of down tubes.

19. The disposition structure of a heat exchanger in a motorcycle according claim 10, wherein the heat exchanger is mounted on a crankcase and extends forwardly beyond a forward edge of a cylinder block of the engine.

* * * * *